No. 703,631. Patented July 1, 1902.
J. W. ZEHRINGER.
TRAP.
(Application filed Mar. 24, 1902.)
(No Model.)

Witnesses:
Fred S. Greenleaf.
Herman J. Sartoris.

Inventor.
John W. Zehringer,
by Crosby Gregory
Attys.

THE NORRIS PETERS CO., PHOTO-LITHO., WASHINGTON, D. C.

UNITED STATES PATENT OFFICE.

JOHN W. ZEHRINGER, OF BOSTON, MASSACHUSETTS.

TRAP.

SPECIFICATION forming part of Letters Patent No. 703,631, dated July 1, 1902.

Application filed March 24, 1902. Serial No. 99,599. (No model.)

*To all whom it may concern:*

Be it known that I, JOHN W. ZEHRINGER, a citizen of the United States, and a resident of Boston, county of Suffolk, State of Massachusetts, have invented an Improvement in Traps, of which the following description, in connection with the accompanying drawings, is a specification, like characters on the drawings representing like parts.

This invention relates to a trap for use in connection with plumbing, and especially adapted for use as a bath-trap, my invention having for its object the production of a simple, efficient, and thoroughly-sanitary trap of novel and convenient construction.

Self-scouring traps provided with a clean-out opening below a water seal have been devised; but such traps are very expensive and are not adapted for use in some locations.

The well-known "pot," "drum," or "round" trap has the advantage of cheaper cost, greater capacity for water, thereby guarding against evaporation, and is largely used in many localities. It is specified by architects and approved by plumbing inspectors; but it is open to a number of practical objections as it is commonly made.

In my present invention I have so changed and improved the structure of the pot or drum type of trap that the objections to its use are entirely overcome, and it is as thoroughly sanitary and as highly efficient as other types of traps known to me, but much less expensive to place in position.

The various novel features of my invention will be hereinafter described, and particularly pointed out in the claims.

Figure 1:
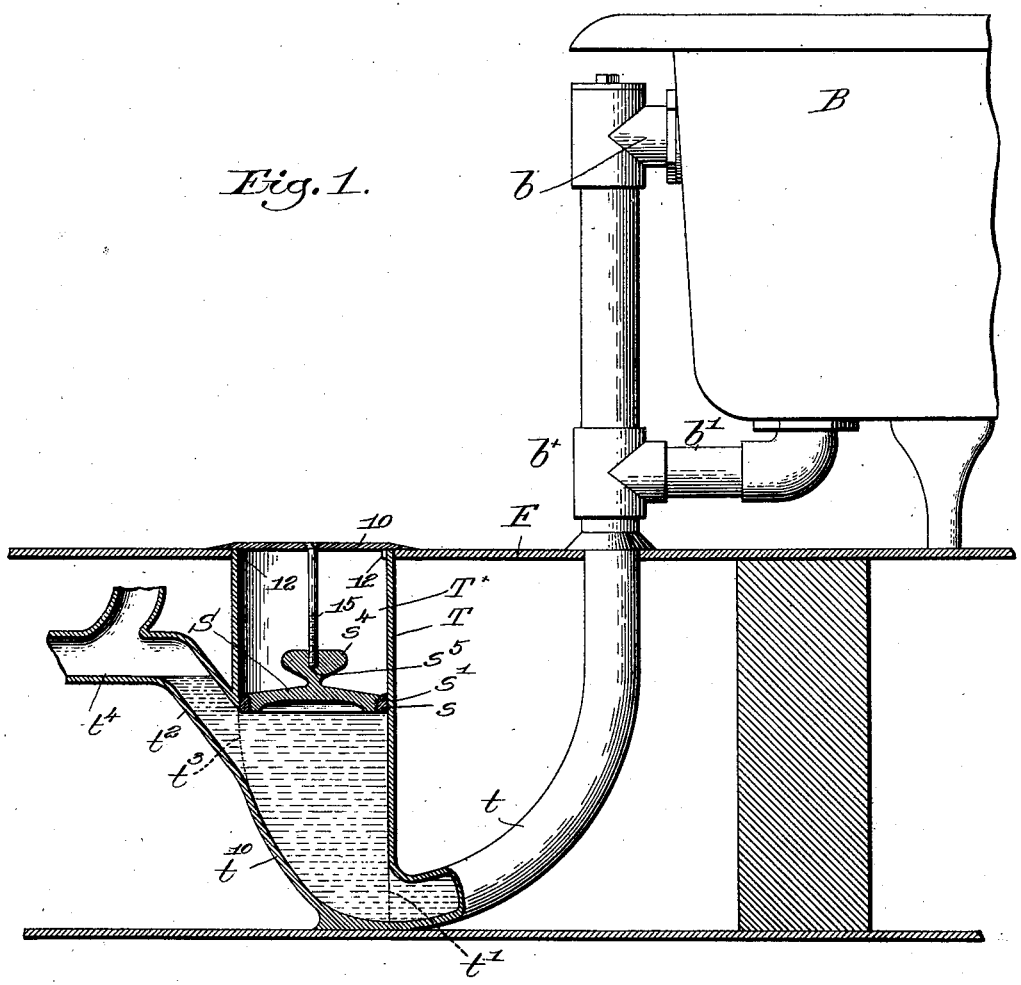
Figure 2:
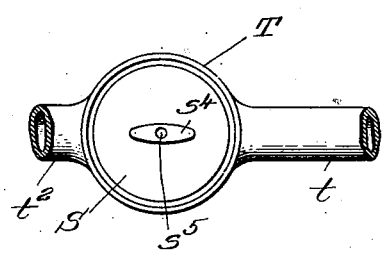
Figure 3:
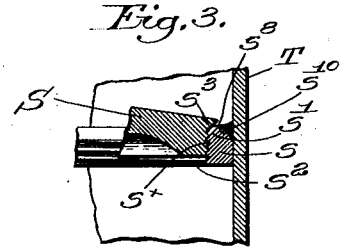

Figure 1 is a view in vertical section and part elevation of a trap embodying one form of my present invention. Fig. 2 is a top or plan view of the trap with the cover of the clean-out chamber removed, and Fig. 3 is an enlarged sectional detail of the clean-out opening and the closure therefor.

Referring to Fig. 1, I have shown a portion of a bath-tub B, with its waste-pipes $b$ $b'$, of usual construction, connected by a union $b^\times$ and by said union communicating with the inlet branch $t$ of the trap. The trap is shown as located below the floor F, on which the tub stands, a common location for such traps.

In accordance with my invention the trap comprises a tubular upright body or drum T, having an inlet-port $t'$ in its side wall adjacent the closed bottom, as herein shown, the inlet branch $t$ being connected with the body in any usual manner. Substantially diametrically opposite the inlet branch the discharge branch $t^2$ of the trap communicates with the interior of the body by a discharge-port $t^3$, the discharge branch being located considerably above the inlet branch. The discharge branch is shown as upturned and then bent in a substantially horizontal direction, as at $t^4$, and is connected with the waste-pipe (not shown) in any suitable manner. If the body of the trap is made of drawn or spun lead, the branches may be united therewith by wiped joints; but it will be manifest that the body and branches may be made integral if the trap is cast. An annular seat $s$ is secured to or forms a part of the body T between the branches and below the water-line of the trap, as shown, said seat having preferably a beveled face $s'$ and being interiorly screw-threaded at $s^2$. (See Fig. 3.) A clean-out closure S, threaded at $s^\times$ to engage the threaded seat $s$, is also provided with an annular beveled face $s^3$ to fit tightly upon the face $s'$ of the seat, either by a ground joint or with a washer, and a handhold $s^4$ is made on the top of the closure.

In practice the top of the trap-body T is brought flush with the floor through a hole therein, (see Fig. 1,) and a metal cap 10, having positioning-lugs 12, fits over and closes the chamber $T^\times$ in the body above the clean-out closure.

To provide a neat and convenient device for retaining the cover in place, I have shown a long headed screw 15, passed through the cover and screwed into a threaded hole $s^5$ in the handhold $s^4$ of the closure S.

It will be manifest that whenever it is necessary to clean the trap it is readily effected by unscrewing the screw 15 and removing the cover 10, when the workman can insert his hand into the trap-body and readily unscrew the closure S, after which the trap can be thoroughly cleaned. This top clean-out is of the greatest convenience, manifestly, as it is so accessible, and it will be noticed that the closure is so located that it is below the water-line of the trap, a feature of the highest importance.

Should there be any leakage about the clean-out, the water from the trap-body beneath will pass through into the chamber T^x and up to the water-line, and thus submerge the closure, so that a water seal is thus automatically provided to prevent foul odors or gases passing through the trap and up into the room by way of the trap-body. It is immaterial, therefore, whether the cover 10 is air and gas tight or not, as no gas or air can pass up into the chamber T^x.

Pot and drum traps have been objected to heretofore because they are not self-scouring, and it has been the theory that sediment accumulated therein. I have overcome this objection in my present invention by curving the bottom and side wall of the body upward from the inlet opening or port $t$ to the oppositely-located and higher discharge-port, as at $t^{10}$, Fig. 1, so that the entering water sweeps up along such curved portion to the discharge branch, and thus makes the trap self-scouring.

When the body of the trap is made of lead, the seat $s$ will be preferably made of brass, and I have shown the top of the seat inwardly beveled, as at $s^8$, (see Fig. 3,) to form with the side wall of the body a kind of annular trough to hold the solder $s^{10}$ to secure the seat in place.

If the trap is made of cast-brass, the seat will be formed integral with the body thereof.

The trap may be adjusted as to its length by cutting off the upper end of the body T to the desired extent, so that it shall come flush with the floor when in position, and the holding-screw 15 will be cut accordingly at the threaded end.

My invention is not restricted to the precise construction herein shown and described, as the same may be modified or rearranged in various particulars without departing from the spirit and scope of my invention.

Having fully described my invention, what I claim as new, and desire to secure by Letters Patent, is—

1. A trap comprising an upright tubular body or drum open at its upper end and having an inlet-port in its side wall adjacent its permanently-closed bottom, a discharge-port located above and opposite the inlet-port, a removable cover for the upper end of said body and a clean-out closure independent of the cover and detachably secured wholly within the upright body below the water-line of the trap and between the inlet and discharge ports thereof.

2. A trap comprising an upright tubular body or drum open at its upper end and having an inlet-port in its side wall adjacent its bottom, a discharge-port located above and opposite the inlet-port, an annular, interiorly-threaded seat in the body below the water-line of the trap and between the ports, a removable cover for the upper end of said body, a clean-out closure wholly within the body and independent of the cover, said closure having an external thread to engage the thread of the seat, and a device on the upper side of the closure to turn it.

3. A trap comprising an upright tubular body having inlet and discharge branches at different heights above its bottom, an annular seat in the body below the discharge and above the inlet, and below the water-line of the trap, a clean-out closure detachably connected with the seat, to close the body thereat, a removable cover for the upper, open end of the body, and means to detachably connect the cover with the closure, to retain the former in place.

4. A trap comprising an upright tubular body having an inlet-port in its side wall adjacent the bottom and having its bottom and side wall opposite the inlet-port upwardly curved, a discharge-port at the upper end of the curved portion, and a clean-out closure detachably mounted in the body below the water-line of the trap and below the discharge-port.

5. A trap comprising an upright tubular body or drum having diametrically opposite inlet and discharge branches, one above the other, the wall of the body opposite to the inlet branch being upwardly curved to the discharge branch, to provide for an uninterrupted sweep of the water through the lower part of and to scour the body, and a clean-out closure detachably mounted in the body below the water-line of the trap and between the inlet and discharge branches.

In testimony whereof I have signed my name to this specification in the presence of two subscribing witnesses.

JOHN W. ZEHRINGER.

Witnesses:
JOHN A. SIMONS,
JAMES A. COTTER.